(12) United States Patent
Tatsumi et al.

(10) Patent No.: US 7,765,041 B2
(45) Date of Patent: Jul. 27, 2010

(54) ELECTRONIC CONTROL APPARATUS FOR VEHICLE AND DIAGNOSING METHOD THEREOF

(75) Inventors: Motoki Tatsumi, Isesaki (JP); Kazuhiko Abe, Yokohama (JP); Mitsuhiko Kubota, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 642 days.

(21) Appl. No.: 11/655,269

(22) Filed: Jan. 19, 2007

(65) Prior Publication Data
US 2007/0192001 A1 Aug. 16, 2007

(30) Foreign Application Priority Data
Jan. 20, 2006 (JP) ............... 2006-012684

(51) Int. Cl.
*G01M 17/00* (2006.01)
(52) U.S. Cl. .................... 701/29; 701/33; 123/399; 123/683; 123/295; 123/436; 370/235; 370/241; 477/7
(58) Field of Classification Search ............... 701/29, 701/33, 34; 123/396, 399, 683, 188.1, 295, 123/436; 370/235, 241, 242; 477/7
See application file for complete search history.

(56) References Cited

U.S. PATENT DOCUMENTS

| | | | | |
|---|---|---|---|---|
| 5,416,708 A | * | 5/1995 | Matsuto et al. ............... 701/71 |
| 6,073,610 A | * | 6/2000 | Matsumoto et al. ......... 123/396 |
| 6,256,569 B1 | * | 7/2001 | Kobayashi .................... 701/70 |
| 6,619,259 B2 | * | 9/2003 | Tomita et al. ............... 123/396 |
| 7,239,946 B2 | * | 7/2007 | Sowa .......................... 701/29 |
| 7,246,024 B2 | * | 7/2007 | Muramatsu et al. ......... 702/116 |
| 2005/0224048 A1 | * | 10/2005 | Hoshino et al. ............. 123/396 |
| 2005/0263146 A1 | * | 12/2005 | Oono et al. ................. 123/690 |
| 2006/0042858 A1 | * | 3/2006 | Boyle et al. ................. 180/402 |
| 2006/0089767 A1 | * | 4/2006 | Sowa .......................... 701/29 |
| 2006/0089768 A1 | * | 4/2006 | Sakurai et al. ................ 701/29 |
| 2006/0149441 A1 | * | 7/2006 | Takamura .................... 701/34 |
| 2006/0200283 A1 | * | 9/2006 | Furuno et al. ............... 701/29 |
| 2007/0093947 A1 | * | 4/2007 | Gould et al. ................. 701/29 |
| 2007/0100520 A1 | * | 5/2007 | Shah et al. ................... 701/33 |
| 2007/0135977 A1 | * | 6/2007 | Mindeman ................... 701/29 |

FOREIGN PATENT DOCUMENTS

JP 2002-314632 10/2002

* cited by examiner

*Primary Examiner*—Tuan C To
(74) *Attorney, Agent, or Firm*—Foley & Lardner LLP

(57) ABSTRACT

An electronic control apparatus for a vehicle having an engine control unit 114 controlling an electronically-controlled throttle of an engine and a valve control unit 141 controlling a variable lift mechanism 112 that varies a lift amount of an intake valve are provided. Information of a target lift amount and an actual lift amount is transmitted/received between these control units. Each of the control units diagnoses a state of data transmission from the other control unit, transmits the diagnosis result to the other control unit and, when the diagnosis result of itself and/or the diagnosis result of the other control unit shows an abnormal state, moves to the mode of a fail-safe operation.

6 Claims, 7 Drawing Sheets

ELECTRONIC CONTROL APPARATUS FOR VEHICLE AND DIAGNOSING METHOD THEREOF

BACKGROUND OF THE INVENTION

1. Field of the Invention

The present invention relates to an electronic control apparatus adapted for a vehicle, not exclusively but preferably a car, and provided with a plurality of control units and a communication circuit providing a connection for communication among the control units.

2. Description of the Related Art

Japanese Unexamined Patent Publication No. 2002-314632 discloses a system in which data communication is performed among a plurality of control units. Each of the control units detects whether or not a communication abnormality occurs on the basis of the cycles of received data and, when occurrence of the communication abnormality is detected, each of the control units executes a fail-safe mode.

In the conventional diagnosis of communication abnormality, each of the control units diagnoses an own reception state but cannot diagnose a reception state of the associated control unit or units.

Consequently, the fail-safe mode cannot be properly executed with respect to a reception abnormality of the other associated control unit or units, and there is such a possibility that controllability might largely deteriorate.

SUMMARY OF THE INVENTION

An object of the present invention is to determine occurrence of a communication abnormality more accurately and to execute a fail-safe mode more properly with respect to the communication abnormality.

To achieve the object, in accordance with the present invention, there is provided an electronic control apparatus adapted for a vehicle, and incorporating therein a plurality of control units associable in communication with one another and a communication circuit providing a connection for communication among the control units, each control unit being configured to diagnose an abnormality in data reception and transmit the diagnosis result to other control unit in association for communication, thereby to diagnose an abnormality that occurs in the communication circuit on the basis of both the diagnosis result of the control unit per se and a diagnosis result transmitted from the associated control unit in communication.

In accordance with another aspect of the present invention, there is provided a diagnosing method of an electronic control apparatus for a vehicle, having a plurality of control units associable in communication with one another and a communication circuit that connects the plurality of control units to one another for communication among the control units.

The other objects, features, and advantages of this invention will become understood from the following description with reference to the accompanying drawings.

DESCRIPTION OF THE PREFERRED EMBODIMENTS

Embodiments of the present invention will be described hereinbelow.

Figure 1:
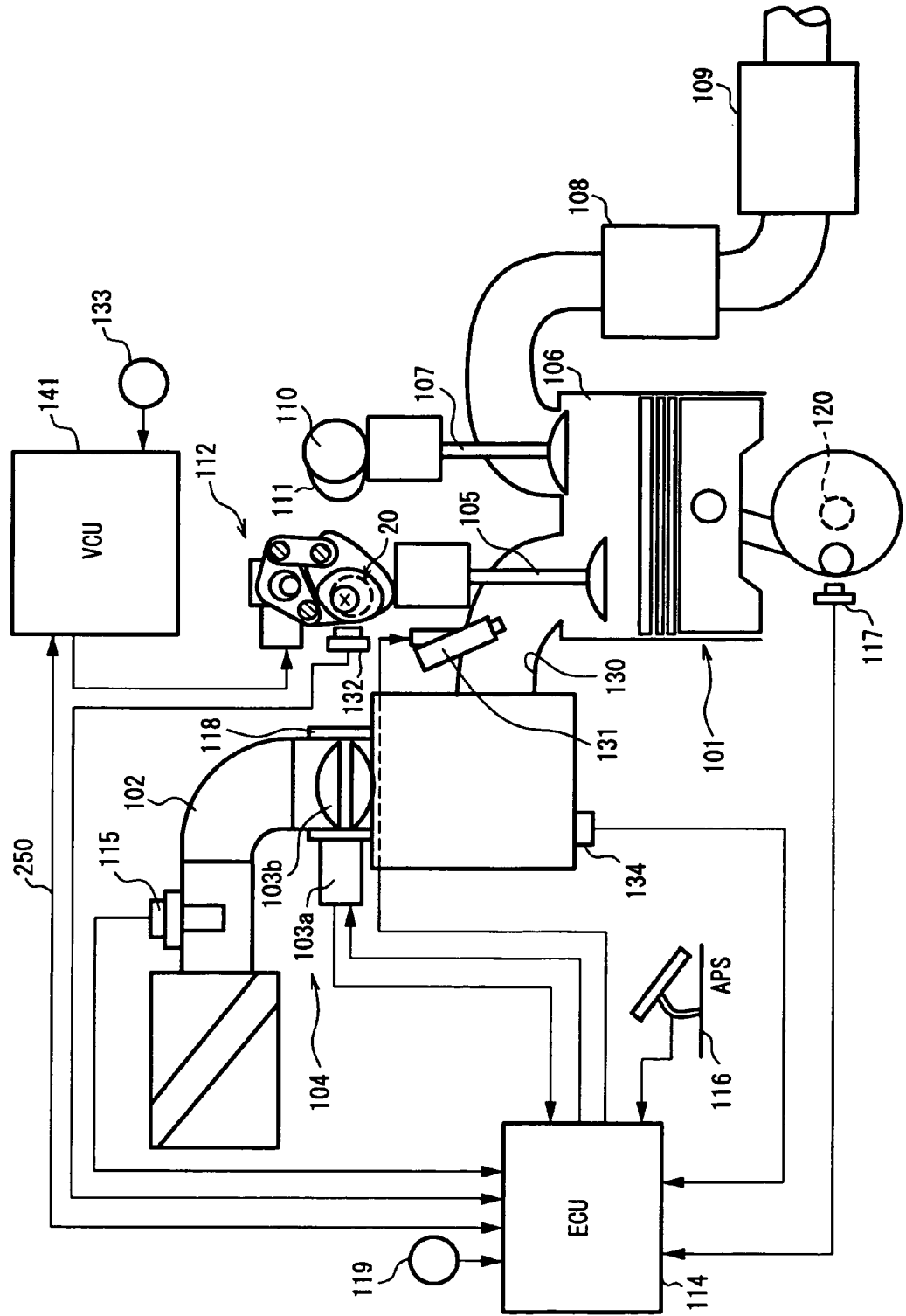
FIG. 1 is a system diagram of a vehicular engine to which the present invention is applied.

FIG. 1 is a system configuration diagram of a vehicular engine, e.g., a car engine.

Referring to FIG. 1, an electronically-controlled throttle 104 for driving a throttle valve 103b by a throttle motor 103a is disposed in an intake pipe 102 of an engine (gasoline internal combustion engine) 101.

Air is sucked into a combustion chamber 106 via electronically-controlled throttle 104 and an intake valve 105.

An intake port 130 of each of cylinders is provided with a fuel injection valve 131. Fuel injection valve 131 injects fuel (gasoline), an amount of which is proportional to valve open time.

The fuel is ignited and combusted in combustion chamber 106 due to a spark ignition by a not-shown spark plug.

Exhaust gas in combustion chamber 106 is exhausted via an exhaust valve 107, purified by a front catalytic converter 108 and a rear catalytic converter 109, and the resultant gas is exhausted to the atmosphere.

Exhaust valve 107 is driven so as to be opened/closed by a cam 111 provided on an exhaust-side cam shaft 110, with maintaining a predetermined valve lift amount, a valve operation angle, and a valve timing.

On the other hand, intake valve 105 is adjusted by a variable lift mechanism 112 so that the valve lift amount and the operation angle vary continuously.

An engine control unit (ECU) 114 incorporating therein a microcomputer controls fuel injection valve 131, a power transistor for a spark coil, and electronically-controlled throttle 104 by a computing process according to a pre-stored program.

A valve control unit (VCU) 141 incorporating therein a microcomputer is also provided and controls variable lift mechanism 112.

Engine control unit 114 and valve control unit 141 are arranged to perform necessary controlling motions in associate with each other and are, therefore, connected to one another via a communication circuit 250 to carry out diverse communications therebetween.

A target lift amount computed by engine control unit 114 is transmitted to valve control unit 141 and, on the other hand, data indicating an actual valve lift amount is transmitted from valve control unit 141 to engine control unit 114.

To engine control unit 114, detection signals are inputted from an air flow meter 115 for detecting an intake air amount of engine 101, an accelerator pedal sensor 116 for detecting a stroke amount of an accelerator pedal operated by a driver of the vehicle, a crank angle sensor 117 for detecting a section to be detected, which is provided on a signal plate supported by a crankshaft 120 and for outputting a crank angle signal at each of reference rotational positions of crankshaft 120, a throttle sensor 118 for detecting an opening angle TVO of throttle valve 103b, a water temperature sensor 119 for detecting temperature of cooling water of engine 101, a cam angle sensor 132 for detecting an intended section for detection, which is provided on a signal plate supported by an intake valve drive shaft 3, and for outputting a cam angle signal at each of reference rotational positions of intake valve drive shaft 3, and an intake pressure sensor 134 for detecting an intake manifold pressure on the downstream of throttle valve 103b and on the upstream side of intake valve 105.

Figure 2:
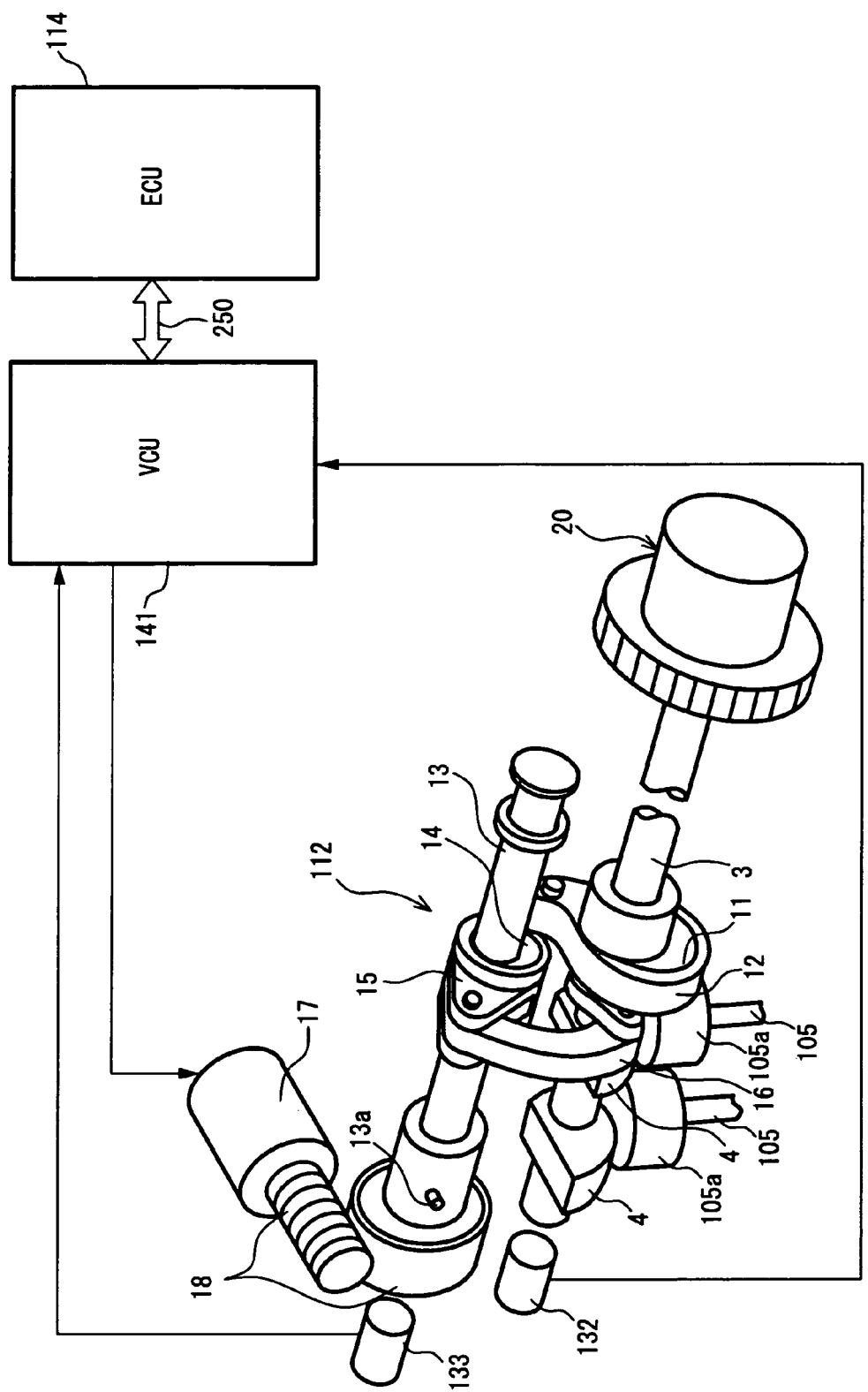
FIG. 2 is a perspective view showing the details of a variable lift mechanism illustrated in FIG. 1.

FIG. 2 is a perspective view showing the structure of variable lift mechanism 112.

In engine 101 of the present embodiment, a pair of intake valves 105 is provided for each of the cylinders, and intake valve drive shaft 3 rotatably driven by crankshaft 120 is supported along a cylinder line direction above intake valves 105.

An oscillating cam 4 in contact with a valve lifter 105a of an associated one of intake valves 105 and opening/closing this intake valve 105 is mounted to be fit onto intake valve drive shaft 3 so as to be relatively rotatable.

Between intake valve drive shaft 3 and oscillating cam 4, variable lift mechanism 112 for continuously changing the operation angle and the valve lift amount of intake valve 105 is provided.

At one end of intake valve drive shaft 3, a variable valve timing mechanism 20 is provided which continuously changes the center phase of the operation angle of intake valve 105 by changing the rotation phase of intake valve drive shaft 3 relative to crankshaft 120.

Although variable valve timing mechanism 20 is controlled by engine control unit 114 in the present embodiment, valve control unit 141 may control variable lift mechanism 112 and variable valve timing mechanism 20.

Figure 3:
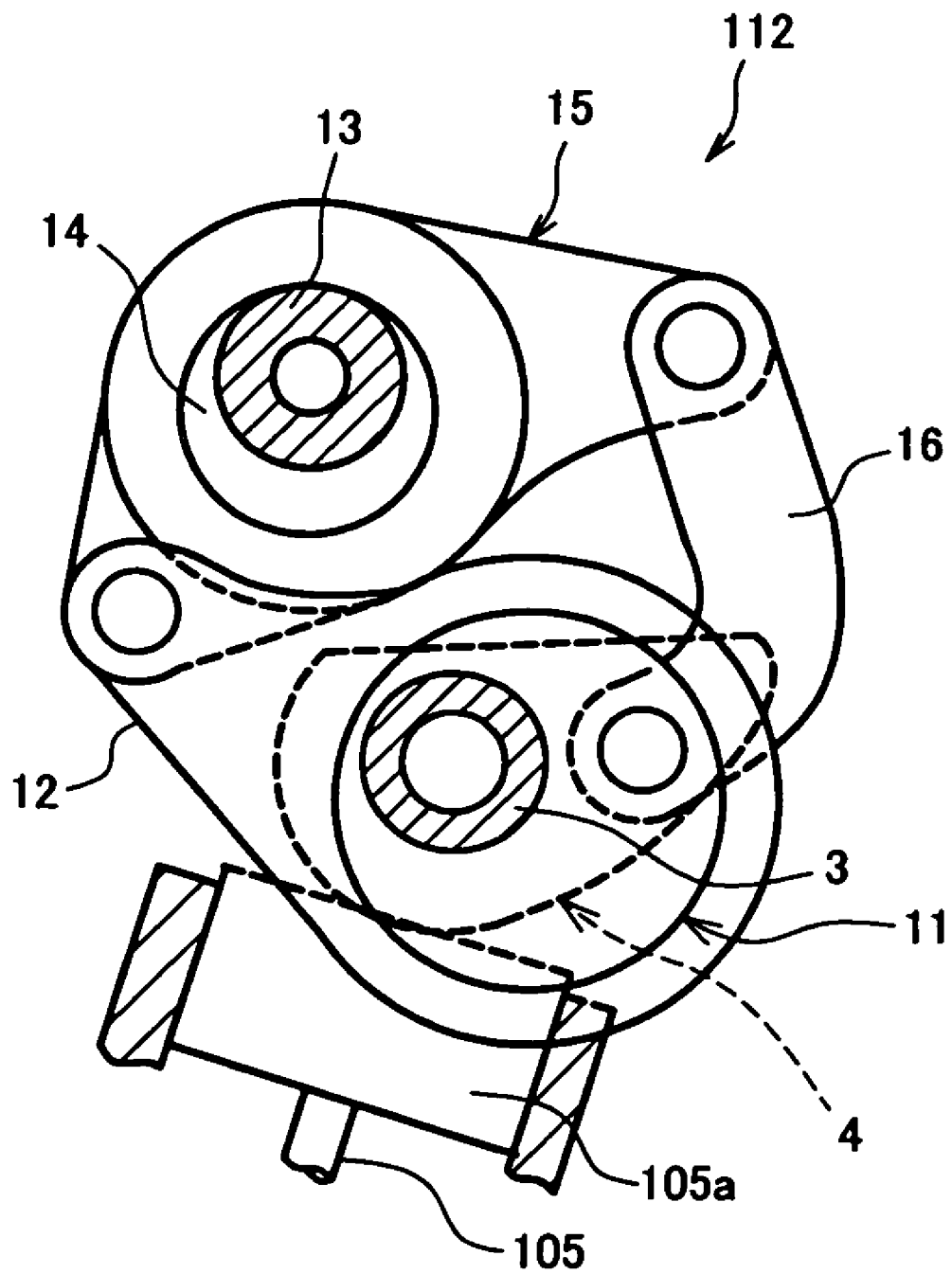
FIG. 3 is a side view showing the details of the variable lift mechanism illustrated in FIG. 1.

As shown in FIGS. 2 and 3, variable lift mechanism 112 has a circular drive cam 11 eccentrically and fixedly provided on intake valve drive shaft 3, a ring-shaped link 12 fit onto drive cam 11 so as to be relatively rotatable, a control shaft 13 extending in the cylinder line direction in almost parallel with intake valve drive shaft 3, a circular control cam 14 eccentrically and fixedly provided on control shaft 13, a rocker arm 15 relatively rotatably fit onto control cam 14 to have one end thereof which is coupled to the tip of ring-shaped link 12, and a rod-shaped link 16 coupled to the other end of rocker arm 15 and oscillating cam 4.

Control shaft 13 is rotated by a motor 17 via a gear train 18. By a stopper 13a integrally provided with control shaft 13 and coming into contact with a suitably arranged stationary side (not illustrated in FIG. 2), control shaft 13 is prevented from further turning to a lift amount reduction side more than an angle position corresponding to a preset minimum lift position.

With the above described configuration, when intake valve drive shaft 3 rotates in association with crankshaft 120, ring-shaped link 12 performs an approximately translatory motion via drive cam 11, rocker arm 15 rocks around the axis of control cam 14, oscillating cam 4 oscillates via rod-shaped link 16, and intake valve 105 is opened/closed.

By changing the rotation angle of control shaft 13 by driving motor 17, the axis position of control cam 14 as the rocking center of rocker arm 15 changes, and the posture of oscillating cam 4 changes.

Consequently, in a state in which the center phase of the operation angle of intake valve 105 is substantially constant, the operation angle and the valve lift amount of intake valve 105 continuously change.

A detection signal from an angle sensor 133 for detecting the rotation angle of control shaft 13 is inputted to valve control unit 141. Valve control unit 141 feedback-controls a flow amount of an electric current to motor 17 on the basis of a detection result of angle sensor 133 in order to rotate control shaft 13 to a target angle position corresponding to a target lift amount transmitted from engine control unit 114.

A power-source relay provided for motor 17 is designed to be capable of being on/off-controlled independently by each of engine control unit 114 and valve control unit 141.

As described above, data of the target lift amount and data of the actual rotation angle of control shaft 13 are transmitted and/or received via communication circuit 250 provided between engine control unit 114 and valve control unit 141. When a communication abnormality occurs, therefore, a desired control cannot be executed.

Figure 4:
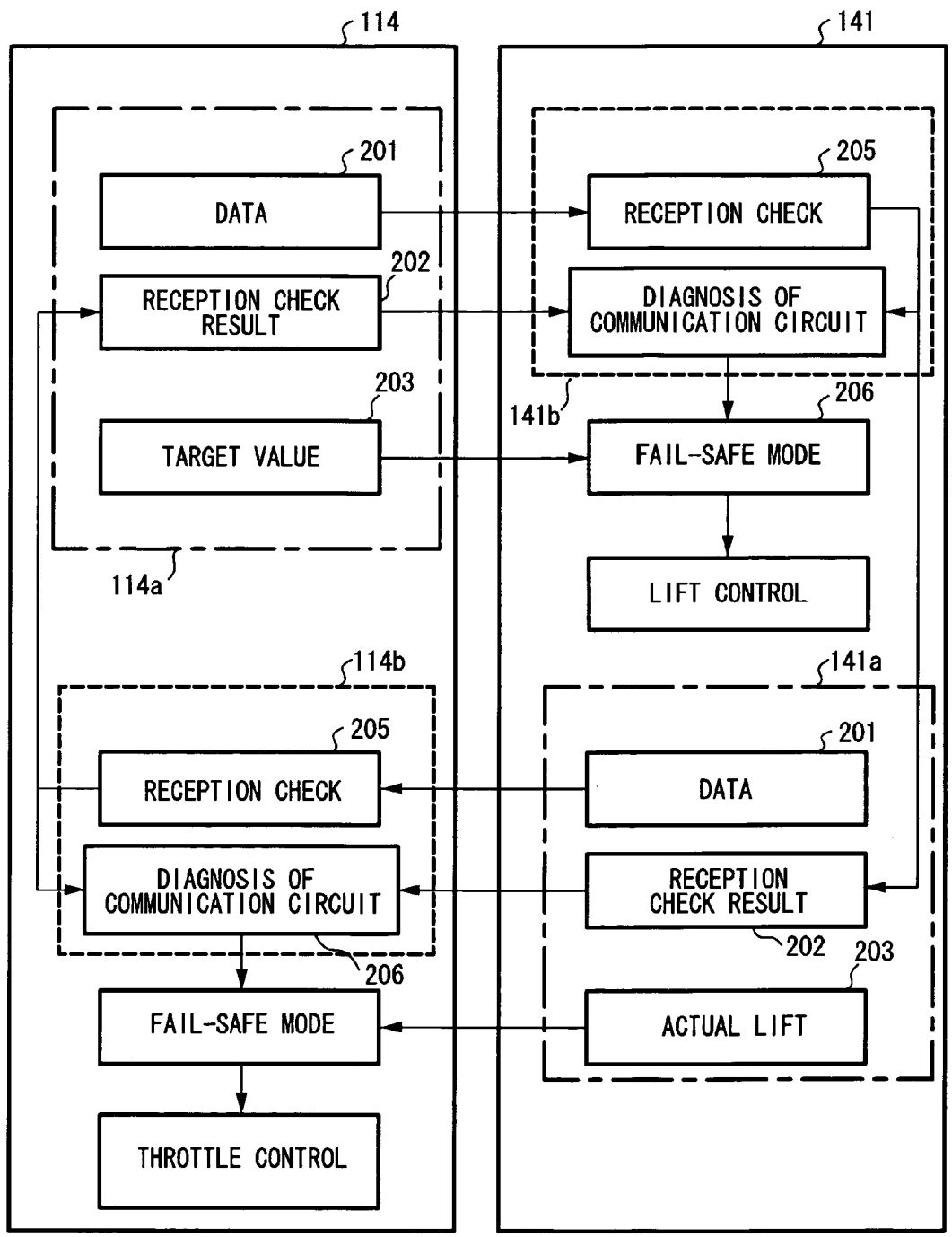
FIG. 4 is a block diagram showing functions of a control unit illustrated in FIG. 1.

Consequently, with a configuration of control unit 114 and valve control unit 141, as shown in FIG. 4, diagnosis of a communication abnormality and a fail-safe mode are executed.

As shown in FIG. 4, respective engine control unit (ECU) 114 and valve control unit (VCU) 141 that are mutually associated with one another for performing required controlling motions are provided with transmission units 114a, 141a and abnormal-state-determining units 114b, 141b, respectively.

Each of transmission units 114a, 141a includes a transmitting unit 201 that transmits data to be used for reception check to the associated side, a transmitting unit 202 for transmitting a determination result obtained by its own abnormal-state-determining units 114b, 141b to the associated side, and a transmitting unit 203 that transmits therefrom data of a target lift amount or an actual lift amount.

From transmitting unit 203 of engine control unit 114, the data of the target lift amount is transmitted toward valve control unit 141. On the other hand, from transmitting unit 203 of valve control unit 141, data of the rotation angle of control shaft 13 is transmitted toward engine control unit 114.

Each of abnormal-state-determining units 114b, 141b includes: a reception check unit 205 for receiving data outputted from transmitting unit 201 on the associated side, diagnosing a communication state based on communication cycles of the reception data, and outputting a diagnosis result to transmitting unit 202 and a diagnosing unit 206 which will be described later; and diagnosing unit 206 that reads a diagnosis result transmitted from transmitting unit 202 of the associated side and a diagnosis result of its own reception check unit 205, and diagnosing an abnormal state of communication circuit 250.

With each of reception check units 206 of engine and valve control units 114 and 141, in the case where a diagnosis result transmitted from transmitting unit 202 of the associated side is abnormal and/or in the case where a diagnosis result of its own reception check unit 205 is abnormal, diagnosing unit 206 determines that an abnormality has occurred in communication circuit 250.

Each of engine control unit 114 and valve control unit 141, when any one of or both of diagnosing units 206 determines or determine that an abnormality has occurred in communication circuit 250, executes the fail-safe mode for itself.

Hence, in the fail-safe mode of valve control unit 141, variable lift mechanism 112 is controlled on the basis of a target lift amount which is pre-stored for the fail-safe mode.

On the other hand, with engine control unit 114, it assumes that variable lift mechanism 112 is controlled on the basis of the lift amount for the fail-safe mode, and then controls the opening angle of throttle valve 103b so as to obtain a target intake air amount under the target lift amount for the fail-safe mode. That is to say, the fail-safe mode of the engine control unit 114 is executed in the described manner. As a result, even if any abnormality occurs in communication circuit 250, an intake air amount can be controlled in accordance with a request, and considerable deterioration in drivability can be avoided.

In contrast, in the case of executing the fail-safe mode only from a result of diagnosis of the reception state of itself, for example, even when valve control unit 141 determines a reception abnormality and enters the fail-safe mode, engine control unit 114 does not always move to the fail-safe mode for executing the fail-safe operation.

Consequently, to assure reliability and safety guarantee, as the fail-safe mode on the side of valve control unit 141, it is necessary to interrupt current flow to motor 17 of variable lift mechanism 112 to thereby control variable lift mechanism 112 to the minimum lift amount.

On the other hand, in the foregoing embodiment, when an abnormal reception state is detected in at least one of engine control unit 114 and valve control unit 141, the information is surely transmitted to the associated side. As a result, almost simultaneously, these control units can move to the mode to execute the fail-safe operation. Therefore, as described above, variable lift mechanism 112 is controlled on the basis of the target lift amount for the fail-safe mode and, on the other hand, the opening angle of the throttle valve can be controlled on such a condition that variable lift mechanism 112 has been controlled to the target lift amount for the fail-safe mode.

Figure 5:
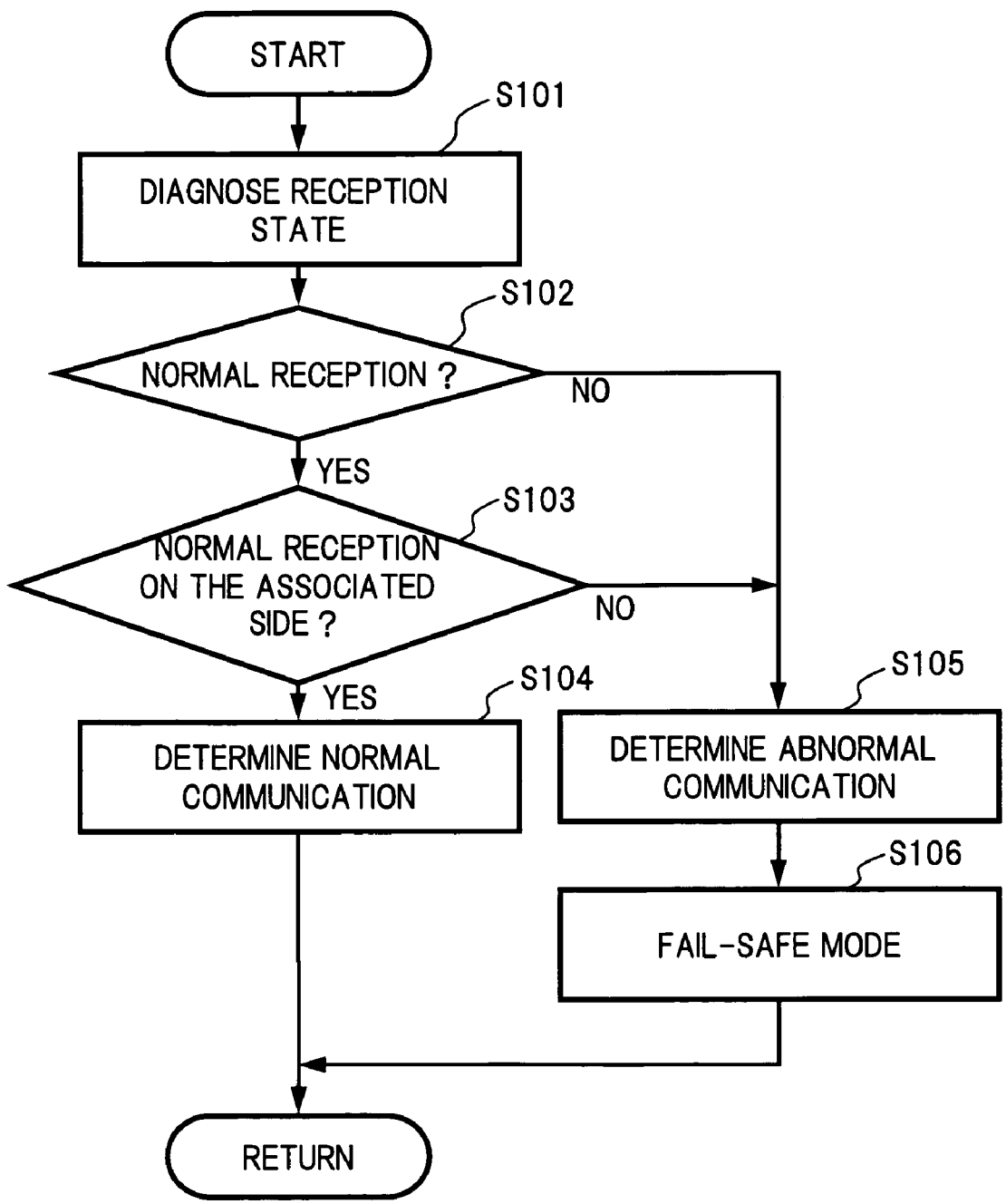
FIG. 5 is a flowchart showing diagnostic control and a fail-safe mode common to the control units.

The flowchart of FIG. 5 relates to determination of an abnormality in communication circuit 250 (network) and the fail-safe mode performed by engine control unit 114 and valve control unit 141.

In the flowchart of FIG. 5, in step S101, data transmitted from the associated side is received, thereby executing determination of reception state. In this case, the communication state is diagnosed from cycles of communication for mutually communicating reception data. Thus, it is preferable to finally determine occurrence of abnormal reception when abnormal communication cycles continue for predetermined time.

In the following step S102, it is determined whether a result of diagnosis of the reception state in the step S101 is normal or abnormal.

When it is determined in the step S102 that the reception state is normal, the control unit proceeds to step S103 where whether a result of diagnosis of the reception state on the associated side transmitted from the associated side is normal or not is determined.

Then, when it is determined that the reception state on the associated side is also normal, the control unit proceeds to step S104 where it is determined that communication circuit 250 is normal.

To the contrary, when it is determined in the step S102 that the reception result of the control unit itself is abnormal or when it is determined in the step S103 that the diagnosis result of the reception result on the associated side is abnormal, the control unit proceeds to step S105.

In the step S105, it is determined that an abnormality has occurred in communication circuit 250.

When an abnormality in communication circuit 250 is determined, in the following step S106, a preset fail-safe mode is executed.

In the fail-safe mode, on condition that the associated side also enters the fail-safe mode almost simultaneously, a control is determined.

Specifically, on the side of valve control unit 141, variable lift mechanism 112 is controlled on the basis of the target lift amount which is pre-stored for the fail-safe mode.

On the other hand, on the side of engine control unit 114, on the assumption that variable lift mechanism 112 is controlled to the lift amount for the fail-safe mode, the opening angle of throttle valve 103b is controlled so as to obtain the target intake air amount under the target lift amount for the fail-safe mode.

Abnormalities of communication circuit 250 include a relatively minor abnormality such as noise to a serious abnormality such as disconnection of communication circuit 250. According to the degree of an abnormality, the fail-safe mode can be switched.

Figure 6:
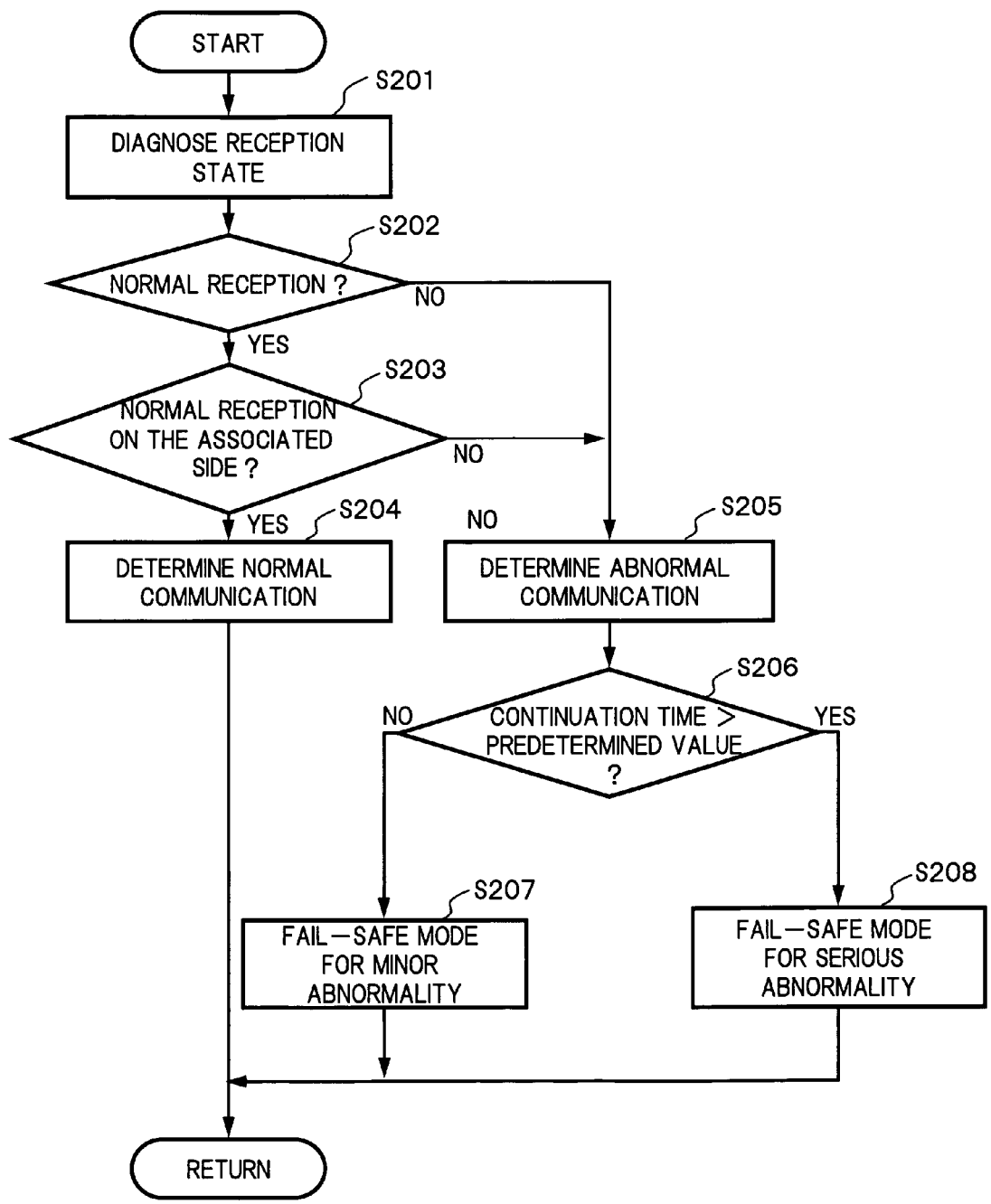
FIG. 6 is a flowchart showing diagnosis and the fail-safe mode performed by a control unit for controlling the variable lift mechanism.

The flowchart of FIG. 6 shows an example in which valve control unit 141 switches the content of the fail-safe mode in accordance with the degree of an abnormality in communication circuit 250.

In the flowchart of FIG. 6, in steps S201 to S205, processes similar to those in the steps S101 to S105 are performed by the valve control unit 141.

When it is determined in step S205 that an abnormality has occurred in communication circuit 250, valve control unit 141 proceeds to step S206 and determines whether or not continuation time in which determination of the abnormality occurrence in communication circuit 250 continues exceeds a predetermined value.

In place of the continuation time of abnormality occurrence, it may take the way of determining as to whether or not the number of times of successive determination of abnormality occurrence in communication circuit 250 exceeds a predetermined value.

When the continuation time (or the number of times of successive determination of abnormality occurrence) is a predetermined value or less, valve control unit 141 determines that an abnormality in communication circuit 250 is minor and proceeds to step S207.

In the step S207, variable lift mechanism 112 is controlled on the basis of the target lift amount which is pre-stored for the fail-safe mode.

On the other hand, when the continuation time (or the number of times of abnormality determination) exceeds the predetermined value, valve control unit 141 determines that an abnormality of communication circuit 250 is serious and proceeds to step S208.

In the step S208, motor 17 for driving variable lift mechanism 112 is forcedly turned off, and variable lift mechanism 112 returns to the initial position (minimum lift position).

The degree of an abnormality in communication circuit 250 can be determined not only by continuation time of the abnormality determination and the number of times of abnormality determination but also by an error with respect to a reference value of communication cycles. The method of determining the degree of an abnormality is not limited.

Figure 7:
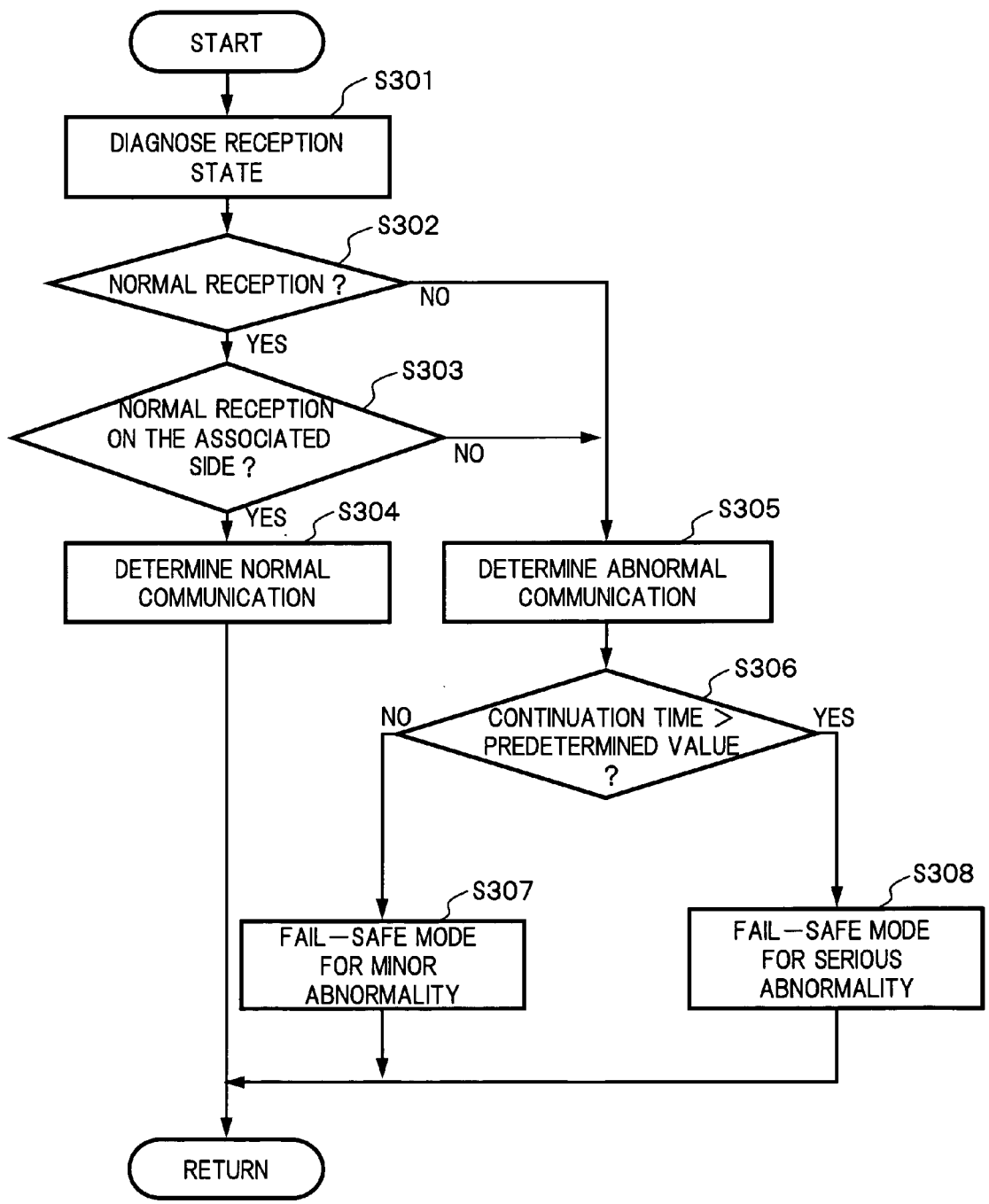
FIG. 7 is a flowchart showing diagnosis and the fail-safe mode performed by a control unit for controlling an electronically-controlled throttle.

The flowchart of FIG. 7 shows an example in which engine control unit 114 switches the fail-safe mode in accordance with the degree of an abnormality in communication circuit 250.

In the flowchart of FIG. 7, in steps S301 to S305, processes similar to those in the steps S101 to S105 are performed.

When it is determined in step S305 that an abnormality has occurred in communication circuit 250, engine control unit 114 proceeds to step S306 and determines whether or not continuation time (or the number of times) in which determination of abnormality occurrence in communication circuit 250 exceeds a predetermined value.

When the continuation time (or the number of times) is the predetermined value or less, engine control unit 114 determines that an abnormality in communication circuit 250 is minor and proceeds to step S307.

In the step S307, on the assumption that variable lift mechanism 112 is controlled on the basis of the target lift amount for the fail-safe mode, the throttle position is controlled according to the requested intake air amount.

On the other hand, when the continuation time (or the number of times) exceeds the predetermined value, engine control unit 114 determines that an abnormality in communication circuit 250 is serious and proceeds to step S308.

In the step S308, motor 17 for driving variable lift mechanism 112 is forcedly turned off, so that variable lift mechanism 112 returns to the initial position (minimum lift position) and, on the assumption that variable lift mechanism 112 has returned to the initial position (minimum lift position), the throttle position is controlled according to the requested intake air amount.

As described above, the degree of an abnormality in communication circuit 250, which is minor or serious, is determined and the fail-safe mode is switched accordingly. Thus, while assuring reliability and safety more certainly, when an abnormality is minor, controllability close to that in a normal state can be maintained.

Although the electronic control apparatus for a vehicle constructed so that engine control unit 114 and valve control unit 141 can perform communications with each other has been described as an example in the foregoing embodiment, similar communication abnormality determination and a similar fail-safe mode can be applied to a combination of, for example, engine control unit 114 and a control unit for controlling a fuel pump, a control unit for controlling an automatic transmission, or the like.

The entire contents of Japanese Patent Application No. 2006-012684, filed Jan. 20, 2006 are incorporated herein by reference.

While only selected embodiments have been chosen to illustrate the present invention, it will be apparent to those skilled in the art from this disclosure that various changes and modifications can be made herein without departing from the scope of the invention as defined in the appended claims.

Furthermore, the foregoing description of the embodiments according to the present invention are provided for illustration only, and not for the purpose of limiting the invention as defined by the appended claims and their equivalents.

We claim:

1. An electronic control apparatus for a vehicle, comprising:
    a first control unit for controlling an electronically-controlled throttle of an engine mounted on a vehicle;
    a second control unit for controlling a variable valve mechanism that makes an open characteristic of an intake valve of the engine variable; and
    a communication circuit that provides a connection for communication between the first and the second control units,
    wherein the first control unit is configured to transmit a target value of the open characteristic of the intake valve to the second control unit,
    wherein the second control unit is configured to transmit a detection value of the open characteristic of the intake valve to the first control unit,
    wherein each of the first and the second control units is configured to diagnose a data reception abnormality, transmit a diagnosis result, and diagnose an abnormality in the communication circuit on a basis of the diagnosis result of the respective control unit and a diagnosis result of the other control unit,
    wherein, when the abnormality in the communication circuit is determined, the second control unit is configured to control the variable valve mechanism to bring the open characteristic of the intake valve into a predetermined open characteristic, and
    wherein, when the first control unit determines an occurrence of the abnormality in the communication circuit, the first control unit is configured to estimate that the open characteristic of the intake valve has become the predetermined open characteristic, to control the electronically-controlled throttle such that a target intake air amount in the predetermined open characteristic is obtained.

2. The electronic control apparatus for the vehicle according to claim 1, wherein the variable valve mechanism comprises a mechanism for continuously varying a lift amount and an operation angle of the intake valve.

3. An electronic control apparatus for a vehicle, comprising:
    a first control unit for controlling an electronically-controlled throttle of an engine mounted on a vehicle;
    a second control unit for controlling a variable valve mechanism that makes an open characteristic of an intake valve of the engine variable; and
    a communication circuit that provides a connection for communication between the first and the second control units,
    wherein the first control unit is configured to transmit a target value of the open characteristic of the intake valve to the second control unit,
    wherein the second control unit is configured to transmit a detection value of the open characteristic of the intake valve to the first control unit,
    wherein each of the first and second control units is configured to diagnose a data reception abnormality, transmit a diagnosis result, and distinctively determine a degree of an abnormality in the communication circuit as a minor abnormality or a serious abnormality on a basis of the diagnosis result of the respective control unit and a diagnosis result of the other control unit;
    wherein, when the minor abnormality is determined, the second control unit is configured to control the variable valve mechanism to bring the open characteristic of the intake valve into a predetermined open characteristic,
    wherein, when the minor abnormality is determined, the first control unit is configured to estimate that the open characteristic of the intake valve has become the predetermined open characteristic to control the electronically-controlled throttle such that a target intake air amount in the predetermined open characteristic is obtained,
    wherein, when the serious abnormality is determined, the second control unit is configured to control the variable valve mechanism to an off state, and
    wherein, when the serious abnormality is determined, the first control unit is configured to control the variable valve mechanism to the off state, to thereby control the electronically-controlled throttle such that a target air-fuel ratio in the off state of the variable valve mechanism is obtained.

4. The electronic control apparatus for the vehicle according to claim 3, wherein the variable valve mechanism comprises a mechanism for continuously varying a lift amount and an operation angle of the intake valve.

5. An electronic control apparatus for a vehicle, comprising:
    a first control means for controlling an electronically-controlled throttle of an engine mounted on a vehicle;

a second control means for controlling a variable valve mechanism that makes an open characteristic of an intake valve of the engine variable; and a communication circuit that provides a connection for communication between the first and the second control means, and wherein the first control means is configured to transmit a target value of the open characteristic of the intake valve to the second control means, wherein the second control means is configured to transmit a detection value of the open characteristic of the intake valve to the first control means, wherein each of the first and the second control means is configured to diagnose a data reception abnormality, transmit a diagnosis result, and diagnose an abnormality in the communication circuit on a basis of the diagnosis result of the respective control means and a diagnosis result of the other control means, wherein, when the abnormality in the communication circuit is determined, the second control means is configured to control the variable valve mechanism to bring the open characteristic of the intake valve into a predetermined open characteristic, and wherein, when the first control means determines an occurrence of the abnormality in the communication circuit, the first control means is configured to estimate that the open characteristic of the intake valve has become the predetermined open characteristic, to control the electronically-controlled throttle such that a target intake air amount in the predetermined open characteristic is obtained.

6. An electronic control apparatus for a vehicle, comprising:

a first control means for controlling an electronically-controlled throttle of an engine mounted on a vehicle;

a second control means for controlling a variable valve mechanism that makes an open characteristic of an intake valve of the engine variable; and a communication circuit that provides a connection for communication between the first and the second control means, and wherein the first control means is configured to transmit a target value of the open characteristic of the intake valve to the second control means, wherein the second control means is configured to transmit a detection value of the open characteristic of the intake valve to the first control means, wherein each of the first and the second control means is configured to diagnose a data reception abnormality, transmit a diagnosis result, and distinctively determine a degree of an abnormality in the communication circuit as a minor abnormality or a serious abnormality on a basis of the diagnosis result of the respective control means and a diagnosis result of the other control means, wherein, when the minor abnormality is determined, the second control means is configured to control the variable valve mechanism to bring the open characteristic of the intake valve into a predetermined open characteristic, wherein, when the minor abnormality is determined, the first control means is configured to estimate that the open characteristic of the intake valve has become the predetermined open characteristic to control the electronically-controlled throttle such that a target intake air amount in the predetermined open characteristic is obtained, wherein, when the serious abnormality is determined, the second control means is configured to control the variable valve mechanism to an off state, and wherein, when the serious abnormality is determined, the first control means is configured to control the variable valve mechanism to the off state, to thereby control the electronically-controlled throttle such that a target air-fuel ratio in the off state of the variable valve mechanism is obtained.

* * * * *